Patented Mar. 14, 1944

2,344,063

UNITED STATES PATENT OFFICE 2,344,063

WEED-DESTROYING PREPARATION

Herbert Schotte, Berlin-Charlottenburg, and Robert Ebert, Berlin-Halensee, Germany; vested in the Alien Property Custodian No Drawing. Application July 11, 1941, Serial No. 401,974. In Germany August 24, 1940

4 Claims. (Cl. 167—45)

This invention relates to preparations for destroying weeds, and more particularly to a weed-destroying agent for use in cultures and fields.

Various compounds on the basis of nitrophenols have already been suggested for combatting insects and the like. But only dinitrophenol and its homologues have found application in practice. These compounds serve not only for combatting animal pests but have been used also for destroying or checking the growth of obnoxious plants such as weeds.

These dinitrophenols have attained an especially highly regarded position as insecticides. But above all they have proved to be excellent agents for destroying weeds; for they represent highly active poisons for the plasma. Said effects are not to be attained with any of the hitherto known mono-nitro-compounds.

Now, according to this invention a mononitrophenol, the 2,6-dichloro-4-nitrophenol, has shown to possess weed-destroying properties which in every respect equal or even partly surpass those of the dinitrophenols. It shows an excellent weed-killing effect and in this property considerably surpasses the copper salts, which have been mostly used for this purpose till now. On spraying a 0.2% suspension of this compound against *Sinapis arvensis*, *Raphanus raphanistrum* or other weeds capable of being readily wetted, already after one to two hours the first marks of burning can be observed on the leaves of the weeds. One day after spraying they are completely withered and destroyed while the cereal plants do not show any damage. When applying dinitro-o-cresol for the same purpose in order to save copper, these effects take place under most favorable conditions only one day after spraying. Besides, this compound frequently does not accomplish the desired effect with certainty. Other mono-nitro compounds used in concentrations mentioned above are even less effective than dinitro cresol and do not show at all the effects of 2,6-dichloro-4-nitrophenol. This is true also with the isomeric 2,4-dichloro-6-nitrophenol. Only 2-chloro-4-nitrophenol stands with regard to its herbicidal activity between dinitro-o-cresol and 2,6-dichloro-4-nitrophenol, but especially in cool weather it is still considerably surpassed by the latter.

Furthermore it was found, that 2,6-dichloro-4-nitrophenol can be dissolved without any loss of activity by first converting it into the urea double compound. In order to secure better solubility, it is advisable to use an excess of urea.

A readily soluble and fully effective preparation is obtained by combining 1 part of 2,6-dichloro-4-nitrophenol with 2,5-4 parts of urea. The combination may be carried out by melting or still better by heating in the presence of a small amount of water. The most favorable method of making said preparation is the following:

1 part of 2,6-dichloro-4-nitrophenol, 3 parts of urea and 3 parts of water are heated while stirring until solution takes place. The compound crystallizing on cooling, is water soluble in concentrations of 1-2%, as they are used for spraying.

Apart from the fact that for the first time a mono-nitro compound was found which reaches the herbicidal effectiveness of the dinitrophenols, the application of 2,6-dichloro-4-nitrophenol and its salts furthermore has the following advantages:

(1) The compound itself, its salts and its urea double compound are not explosive; thus there is no need of selling them on the market in the form of a paste which still might explode on becoming dry.

(2) The yellow color of said compounds is not at all as intense and fast as that of the dinitro compound and may be removed much more readily from clothes and skin by washing.

Of course, it is possible to employ the compounds claimed in any other form and concentration than described above. Furthermore wetting agents and other customary ingredients may be added to the preparation. Also other changes may be made by those skilled in the art in accordance with the principles set forth herein and in the claims annexed hereto.

What we claim is:

1. A weed-destroying preparation whose active ingredient consists essentially of a water-soluble urea double compound of 2,6-dichloro-4-nitrophenol.

2. A spraying solution for use for the destruction of weeds comprising an aqueous suspension of a urea double compound of 2,6-dichloro-4-nitrophenol.

3. A preparation as set forth in claim 1 and containing an excess of urea.

4. A dry preparation for the destruction of weeds, the active ingredient of said preparation consisting essentially of a urea compound of 2,6-dichloro-4-nitrophenol.

HERBERT SCHOTTE.
ROBERT EBERT.